United States Patent [19]

Ashill et al.

[11] Patent Number: 4,718,619
[45] Date of Patent: Jan. 12, 1988

[54] MANOEUVERABLE SUPERCRITICAL WING SECTION

[75] Inventors: Patrick R. Ashill, Bromham; Donald Pierce, Crookham Village; Desmond A. Treadgold, Farnborough; John L. Fulker, Sharnbrook, all of United Kingdom

[73] Assignee: Ministry of Defence, England

[21] Appl. No.: 652,445

[22] Filed: Jul. 20, 1984

[30] Foreign Application Priority Data

Jul. 28, 1983 [GB] United Kingdom ............... 8320334

[51] Int. Cl.$^4$ ............................................. B64C 3/14
[52] U.S. Cl. ................................. 244/35 R; 244/35 A
[58] Field of Search ................... 244/35 R, 35 A, 209, 244/212, 219

[56] References Cited

U.S. PATENT DOCUMENTS

| | | | |
|---|---|---|---|
| 3,309,042 | 3/1967 | Edwards | 244/209 |
| 4,072,282 | 2/1978 | Fulker | 244/35 R |
| 4,361,299 | 11/1982 | Sharrock | 244/219 |

Primary Examiner—Donald P. Walsh
Attorney, Agent, or Firm—Stevens, Davis, Miller & Mosher

[57] ABSTRACT

The manoeuverable supercritical wing section with a t/c ratio of 8-9%, flexible at 70%-80% chord by means of a flap to induce expansion thereover, and perhaps having a minimum curvature region on the upper surface just ahead of the flexing region.

23 Claims, 7 Drawing Figures

KEY:

—×— = SECTION A

—○— = SECTION B

Fig.2.

| X/c | SECTION A | | SECTION B | |
| --- | --- | --- | --- | --- |
| | Zu/c | Zl/c | Zu/c | Zl/c |
| 0.000000 | 0.001560 | +0.001560 | 0.001560 | +0.001560 |
| 0.002981 | 0.009172 | −0.006151 | 0.009172 | −0.006151 |
| 0.008679 | 0.013717 | −0.010951 | 0.013717 | −0.010951 |
| 0.014039 | 0.016445 | −0.013975 | 0.016445 | −0.013975 |
| 0.019292 | 0.018575 | −0.016392 | 0.018575 | −0.016392 |
| 0.024707 | 0.020448 | −0.018536 | 0.020448 | −0.018536 |
| 0.030523 | 0.022214 | −0.020528 | 0.022214 | −0.020528 |
| 0.037083 | 0.023984 | −0.022447 | 0.023984 | −0.022447 |
| 0.044772 | 0.025850 | −0.024365 | 0.025850 | −0.024365 |
| 0.054190 | 0.027766 | −0.026339 | 0.027766 | −0.026339 |
| 0.066066 | 0.029627 | −0.028392 | 0.029627 | −0.028392 |
| 0.081200 | 0.031513 | −0.030492 | 0.031513 | −0.030492 |
| 0.100083 | 0.033545 | −0.032516 | 0.033545 | −0.032516 |
| 0.122447 | 0.035634 | −0.034317 | 0.035634 | −0.034317 |
| 0.147263 | 0.037623 | −0.035930 | 0.037623 | −0.035930 |
| 0.173324 | 0.039396 | −0.037239 | 0.039396 | −0.037239 |
| 0.199722 | 0.040924 | −0.038214 | 0.040924 | −0.038214 |
| 0.225942 | 0.042215 | −0.038912 | 0.042215 | −0.038912 |
| 0.251746 | 0.043301 | −0.039375 | 0.043301 | −0.039375 |
| 0.277060 | 0.044209 | −0.039604 | 0.044209 | −0.039604 |
| 0.301888 | 0.044966 | −0.039619 | 0.044966 | −0.039619 |
| 0.326276 | 0.045595 | −0.039430 | 0.045595 | −0.039430 |
| 0.350281 | 0.046112 | −0.039057 | 0.046112 | −0.039057 |
| 0.373966 | 0.046529 | −0.038498 | 0.046529 | −0.038498 |
| 0.397389 | 0.046859 | −0.037736 | 0.046859 | −0.037736 |
| 0.420605 | 0.047111 | −0.036758 | 0.047111 | −0.036758 |
| 0.443660 | 0.047290 | −0.035527 | 0.047290 | −0.035527 |
| 0.466596 | 0.047400 | −0.034024 | 0.047400 | −0.034024 |
| 0.489449 | 0.047444 | −0.032224 | 0.047444 | −0.032224 |
| 0.512244 | 0.047423 | −0.030077 | 0.047423 | −0.030077 |
| 0.535006 | 0.047340 | −0.027582 | 0.047340 | −0.027582 |
| 0.557751 | 0.047193 | −0.024774 | 0.047193 | −0.024774 |
| 0.580492 | 0.046983 | −0.021659 | 0.046983 | −0.021659 |
| 0.603241 | 0.046713 | −0.018270 | 0.046713 | −0.018270 |
| 0.626004 | 0.046377 | −0.014644 | 0.046377 | −0.014644 |
| 0.648790 | 0.045967 | −0.010742 | 0.045967 | −0.010742 |
| 0.671609 | 0.045482 | −0.006595 | 0.045482 | −0.006595 |
| 0.694469 | 0.044937 | −0.002289 | 0.044937 | −0.002289 |
| 0.717388 | 0.044353 | 0.002096 | 0.044353 | 0.002096 |
| 0.740383 | 0.043749 | 0.006413 | 0.043749 | 0.006413 |
| 0.763482 | 0.043091 | 0.010534 | 0.043000 | 0.010534 |
| 0.786719 | 0.042185 | 0.014341 | 0.042500 | 0.014341 |
| 0.810138 | 0.040887 | 0.017722 | 0.040887 | 0.017722 |
| 0.833793 | 0.039369 | 0.020562 | 0.039369 | 0.020562 |
| 0.857753 | 0.037741 | 0.022690 | 0.037650 | 0.022690 |
| 0.882101 | 0.035581 | 0.023972 | 0.035581 | 0.023972 |
| 0.906941 | 0.032915 | 0.024233 | 0.033200 | 0.024233 |
| 0.932402 | 0.030132 | 0.023282 | 0.030300 | 0.023282 |
| 0.958646 | 0.026899 | 0.020806 | 0.026700 | 0.020500 |
| 0.985879 | 0.022273 | 0.015905 | 0.021600 | 0.015905 |
| 1.000000 | 0.017739 | 0.011790 | 0.018250 | 0.012500 |

MANOEUVERABLE SUPERCRITICAL WING SECTION

The present invention relates to aircraft wing sections, particularly supercritical wing sections, that is sections the design cruise airspeed of which is within the range known as supercritical. Supercritical airspeeds are those where freestream velocity is subsonic but at some point over the surface of the section the flow is supersonic.

Supercritical wing sections are described in UK Patent Specifications Nos. 1406826 and 1554713. These demonstrate that a typical supercritical wing section is characterised by an upper surface which is low in curvature, that is somewhat flat, by comparison with the lower surface, while the lower surface is concave toward the trailing edge.

As incidence is increased in the operation of such sections in subsonic freestream conditions above a certain level, a schock wave is formed on the upper surface aft of which there is a slight decline in local Mach Number followed by a rear pressure rise. Further increase in incidence causes the flow to separate the foot of the shock and to reattach on the wing surface later on, thus forming a separation bubble, the bubble increasing in length with increase in incidence until it reaches the start of the rear pressure rise. Then the bubble bursts, or fails to reattach, and the flow becomes disorderly and there is a rapid rise in unsteady forces, drag, and a loss of control effectiveness. This is referred to as flow breakdown. The onset of this condition can be delayed by arranging that the start of rear pressure rise is as far aft as possible, commensurate with there being no significant separation between that start point and the trailing edge. There are clearly limits to this procedure.

The present invention derives from the discovery by the inventors of an alternative way of increasing the freestream Mach Number or incidence before flow break down occurs, leading to a wing which is highly manoeuvrable, that is in which both lift and control are maintained through a high range of supercritical conditions.

A supercritical wing according to the present invention has a downwardly deflectable trailing flap hinged to the wing at between 70% and 80% chord, the upper surface curvature in the region of the flap hinge when the flap is deflected being arranged to be such as to induce reexpansion thereover in supercritical conditions, thus controlling shock induced separation.

By means of the invention it is possible to raise the shock upstream Mach Number from 1.4 to at least 1.56 (corresponding to a pressure coefficient of $-1.9$ for the flow normal to the shock sweep at a freestream Mach Number of 0.7).

The required curvature may be arranged to be on a portion of the flap which is concealed until the flap is deployed. Preferably, however, the required upper surface curvature is realised in a flexible surface flap. Insofar as the said curvature is only required over a limited chordwise extent of the wing section and flap combination, a single pivot point of the flap may be all that is required. A suitable flap arrangement may therefore comprise a flap supporting structure supporting flap upper and lower skins, and rotatably jointed to a main support structure adjacent one skin, a jack connecting said structure adjacent the other skin, a flexible skin extending rearward from the main upper skin over part of the flap supporting structure, and link means between the flexible skin and the flap supporting structure for controlling the disposition of the flexible skin. A flexible skin member may similarly extend rearwardly from the lower main skin.

An alternative flap is decribed in UK Patent Specification No. 153631. It comprises a flexible upper skin and a lower skin, a series of support members extending chordwise in chain-like manner, attached to the lower skin, and rotatably jointed one to another adjacent to the lower surface, above each joint a rod movable in a spanwise direction and means adjacent the upper skin connecting each rod to adjacent support members, for example in a cam and follower relationship, such that movement of the rod causes relative rotation of the support members and a consequent change in flap camber, and means for maintaining the separation between the upper and lower skins in a predetermined relationship. These flaps may also be arranged for use at take-off and landing speeds. Where a flap of the type lateraly described is not required for use at take-off and landing, it may comprise only one of the supporting members, rotatably jointed and operated as described above, but with respect to the supporting structure of the main body of the wing section.

If the said flap and curvature are arranged so that flow thereover in the said sub-critical condition accelerates to just above sonic, it is possible for the forward shock to be stronger and/or further to the rear than would otherwise have been the case, ie the lift generated over that part of the section increased before the flow separates. Means for so controlling the strength and/or location of the shock may comprise a nose flap to the section. In a suitable nose flap wing section combination wherein the wing section has main upper and lower skins and a main support structure the nose flap comprises a forward flap support structure, an intermediate flap support structure, a flexible upper and a lower flap skin, a link member, means controlling the disposition of the flexible upper skin, and a flap jack, the support structures supporting the lower skin, the intermediate support structure being rotatably jointed to the main support structure adjacent the lower surface, and the jack being connected between the intermediate and main support structures above the rotatable joint, the link member extending pivotally between the main structure and the forward support structure being rotatably jointed to the intermediate structure above the point at which the link is jointed to the forward support structure. Alternative nose flap arrangements which are suitable are described in the above-mentioned UK Patent Specification No. 1536331 and in UK Patent Specification No. 1296994. In the latter case, a wing section and flap combination comprises a main supporting structure and an outer skin attached thereto, a swinging frame member pivotally attached to the main structure and supporting a chordwise extremity of the skin, a plurality of arms pivotally attached to the main structure and supporting the upper and lower skin intermediate the main structure and said extremity, and a jack operative between the main structure and the surrounding frame member. In an alternative embodiment of this latter case there is a movable carrier between the main structure and the swinging frame member and to which the latter and the swinging arms are pivotally attached, and a secondary jack between the main structure and the carrier operative to extend or retract the carrier.

By means of this latter embodiment the chord length of a wing section can be substantially preserved when the flap is lowered. This is also an advantage afforded by the double joint feature in the first above described nose flap. In a further alternative the rear flap, and perhaps the nose flap, may be a distinct body of traditional type. Insofar as in the deflected configuration of these flaps there is required to be a certain curvature (other than constant radius curvature) at a certain point, the control mechanism of the flaps may be such that they are extended from the main structure at the same time as being deflected.

Any of the above-mentioned nose flaps may also be arranged for use in take-off and landing. Nose and trailing edge flaps usually have their hinge point just forward and just aft of the forward and rear main frame spars. These tend to lie at 14–20% chord and 65–80% chord respectively. Suitable flap deflections are of the order of 10° and 8° respectively for manoeuvring at a Mach Number between 0.6 and 0.7 and of the order of 50°–60° each for take-off and landing. In a double jointed nose flap the forward-most element may be arranged to deflect twice as much as the intermediate.

According to a feature of the invention the trailing edge flap may be arranged so that the upper surface and lower surface may be separated toward the trailing edge, whereby a thick base can be generated. A thick base is particularly valuable around the design condition on wings according to the present invention. It delays the origination of separation at the trailing edge which might otherwise be generated by a combination of the reexpansion brought about by flap deflection and the aftward positioning of the start of the rear pressure rise, this combination giving rise to a severe adverse pressure gradient. The facility of attenuating the base thickness at will enables the avoidance of drag penalties in other parts of the flight regime when the flap is retracted. The facility may enable the generation of a base thickness of up to 2% chord.

The wing may also incorporate means for minimising the boundary layer thickness ahead of the shock in supercritical conditions. Such means include boundary layer suction and vortex generators and, because at high Reynolds numbers the length of the bubble is, to a reasonable approximation, directly proportional to boundary layer thickness ahead of the shock, will have the effect of retarding the development of the bubble with Mach Number/incidence.

The invention is particularly useful as applied to a supercritical wing having a design cruising speed operating condition in the range $M=0.78$ to 0.86. Such a wing may be characterised by a thickness chord ratio between 8.0 and 9.0%, a leading edge region, an upper surface characterised by a first region extending from the leading edge region to about 10% chord and wherein curvature drops rapidly, a second region extending from about 10% chord to about mid-chord and wherein curvature drops less rapidly, a third, minimum curvature region, extending rearwardly from the second region to about 75% chord, and a fourth region extending rearwardly from the third region to the trailing edge and wherein the curvature is generally higher than in the third region, and the lower surface characterised by a first region extending rearwardly from the leading edge region and wherein curvature is generally higher than over the same extent of the upper surface, a second region extending rearwardly from the first and wherein curvature changes sense, and a third region extending rearwardly from the second region to the trailing edge and wherein the curvature is of the opposite sense to that in the lower surface first region.

Such a wing section thus has a degree of rear loading or camber towards the trailing edge. This may extend over the last 25% of the section.

The leading edge of the section may have a radius of the order of 1% chord. The upper surface first region curvature may be arranged as far as possible to accelerate the flow thereover to supercritical in the design operating condition in such a manner as to ensure, given a suitable curvature over the rest of the aerofoil, that shock free recompression will occur in the second or third regions. Curvature at 10% chord may then be between 0.6 and 1.0 on a unit chord basis.

The upper surface second region is preferably arranged to maintain supercritical flow at the design condition, to bring about recompression in supercritical conditions below the design condition in such a manner as to maximise lift and minimise drag, and in subcritical conditions to maximise lift and minimise drag with or without a deflected nose flap.

The upper surface third, minimum curvature, region may be characterised by a substantially constant curvature, perhaps with one or two minima. It is preferable that the region has its most significant point of minimum curvature as far rearwardly as a requirement to avoid flow separation ahead of the trailing edge will permit, eg at between 70% and 75%.

For an aerofoil of unit chord length the value of the curvature in the third region of the upper surface may be between 0.09 and 0.15, but the third region may have one or two secondary points of minimum curvature, for example at 50% and 58% chord. At the principal minimum curvature point, the curvature may be as little as 0.03, this occurring at about 72% chord.

A wing section in accordance with the present invention will now be described by way of example with reference to the accompanying drawings of which:

FIG. 2 is a table of the section ordinates.

Figure 1:
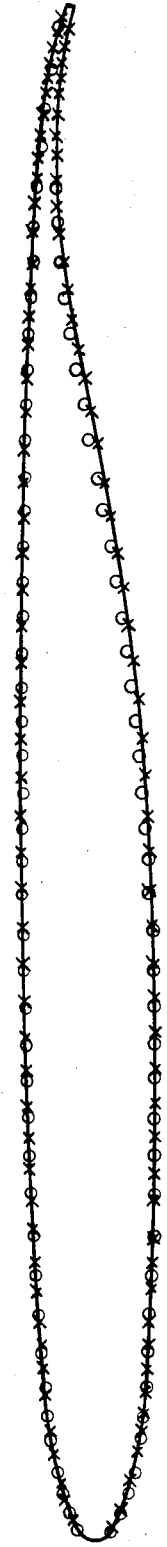
FIG. 1 is a diagram of the section.
Figure 3:
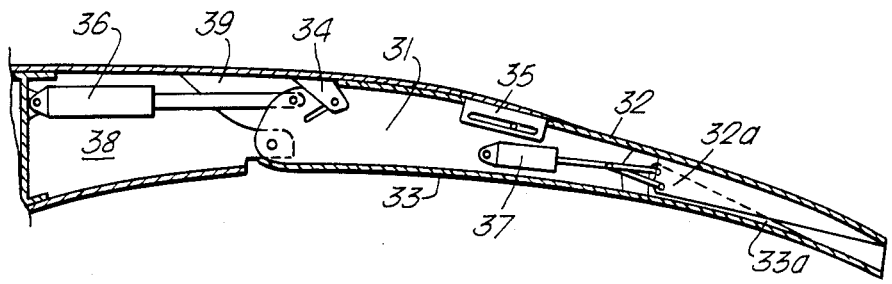
FIG. 3 is a diagram of a trailing edge flap arrangement.

FIGS. 1–3 describe the geometric characteristics of two sections, A and B, in accordance with the invention. Both have a thickness chord ratio of 8.52% with maximum thickness occurring at 35% chord, and a leading edge radius of 0.99%. Sections A and B have trailing edge thicknesses of 0.595% and 0.575% chord respectively. The rear loading of Section B extends further forward than that of Section A, and the rear upper surface of Section B is flatter than that of Section A.

The sections have four distinct curvature regions after the leading edge. The first region is characteristed by a rapid fall in curvature from that at the leading edge to between 0.6 and 1.0 per unit chord at about 10% chord. In the second region, which lasts to about 45% chord, the fall in curvature decelerates considerably.

The third region is marked by a substantially constant low curvature terminating with a principal minimum, value 0.03 (section A) and zero (section B) on a unit chord basis, at 72% chord. In the fourth region the curvature of both sections rises again substantially toward the trailing edge.

In order to impart to the sections high lift at subcritical speeds, eg M=0.65, the geometry of the section is variable fore and aft by means of trailing edge and nose. The trailing edge flap is of the flexible upper surface type, and its effective hinge point is at X=72.5% and Z=1% chord. It incorporates trailing edge splitter means. The nose flap comprises an articulated (two hinge) support structure and, over the upper surface, a flexible skin. The two effective hinge points for the nose flap are X=6.9% and Z=−0.5%, and X=16% and Z=−2% chord respectively.

Figure 4:
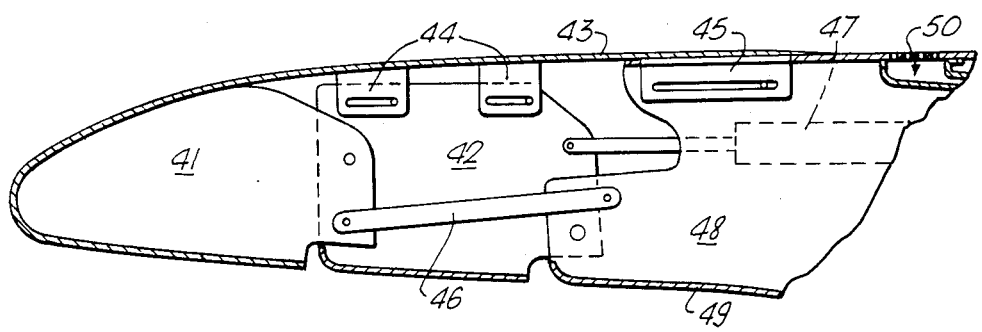
FIG. 4 is a diagram of a nose flap arrangement.

The construction of these flaps is illustrated in FIGS. 3 and 4.

The trailing edge flap shown in FIG. 3 has a support structure 31 supporting upper and lower flap skins 32 and 33 respectively, flexible skin disposition control means 34 and 35 and a flap deployment jack 36, and trailing edge upper and lower skin supports 32a and 33a and a trailing edge splitter jack 37. The structure 31 is pivotally attached to a suitable anchorage formed on a support structure 38 to the basic section, the attachment point being adjacent the lower skin 33. The jack 36 is pivotally anchored to the main support structure 37 and pivotally attached to the flap structure 31 at point above the joint of the structures 31 and 38. The main structure 38 supports an upper skin 39 which extends rearwardly thereof in a flexible manner. The disposition of this flexible portion is controlled by the cam and follower means 34 and 35 which are associated with the structure 31.

The flap is deployed by extension of the jack 36, whereby the structure 31 etc is rotated downwards. The means 34 and 35 respectively constrain the flexible skin extension 39 to a predetermined curvature and in sliding relationship with the flap upper skin 32. It has a maximum deflection of 50°.

The trailing edge of the flap is split by the operation of the jack 37, which pushes on the upper and lower skin supports 32a and 33a and causes the upper and lower surfaces to flex outwards.

The noe flap shown in FIG. 4 comprises a forward support structure 41, and intermediate support structure 42, a flexible upper skin 43, means 44 for controlling the disposition of the skin 43 with respect to the intermediate structure 42, means 45 for anchoring the skin 43, a link 46, and a jack 47. The basic wing has a suitably adapted support structure 48 and a skin 49.

The intermediate structure 42 is pivotally attached to the main structure 48 adjacent the lower skin. Above the pivot point the jack 47 is pivotally attached to the intermediate structure 42, being similarly attached to the main structure 48 (location now shown). Between these two intermediate structure attachment points is a pivotal anchorage for the link 46, the other end of which is pivotally attached to the forward structure 41 adjacent the lower skin. The structure 41 is pivotally attached to the intermediate structure 42 at a point above the attachment point of the link 46 thereto. Between the structure 41 and the main upper skin 49 of the section the skin 43 is flexible, its disposition being controlled by cam and follower means 44. The anchorage 45 controls the local curvature of the skin 43 at the overlap and permits it to slide along the skin 49.

Just aft of the nose flap the wing has boundary layer suction means 50, comprising perforations in the upper skin and ducting leading therefrom.

It will be perceived that when extension of the jack 47 causes swivellling downwards of the structure 42 the link 46 brings about a swivelling downwards of the forward structure 41 with respect to the intermediate structure 42. This is arranged so that when the structure 42 has deflected 3.25° the forward structure 41 will have deflected 6° with respect to it. The maximum deflection of the two structures is arranged to be 20° (intermediate) and 40° (forward) for the landing and takeoff case.

Figure 5:
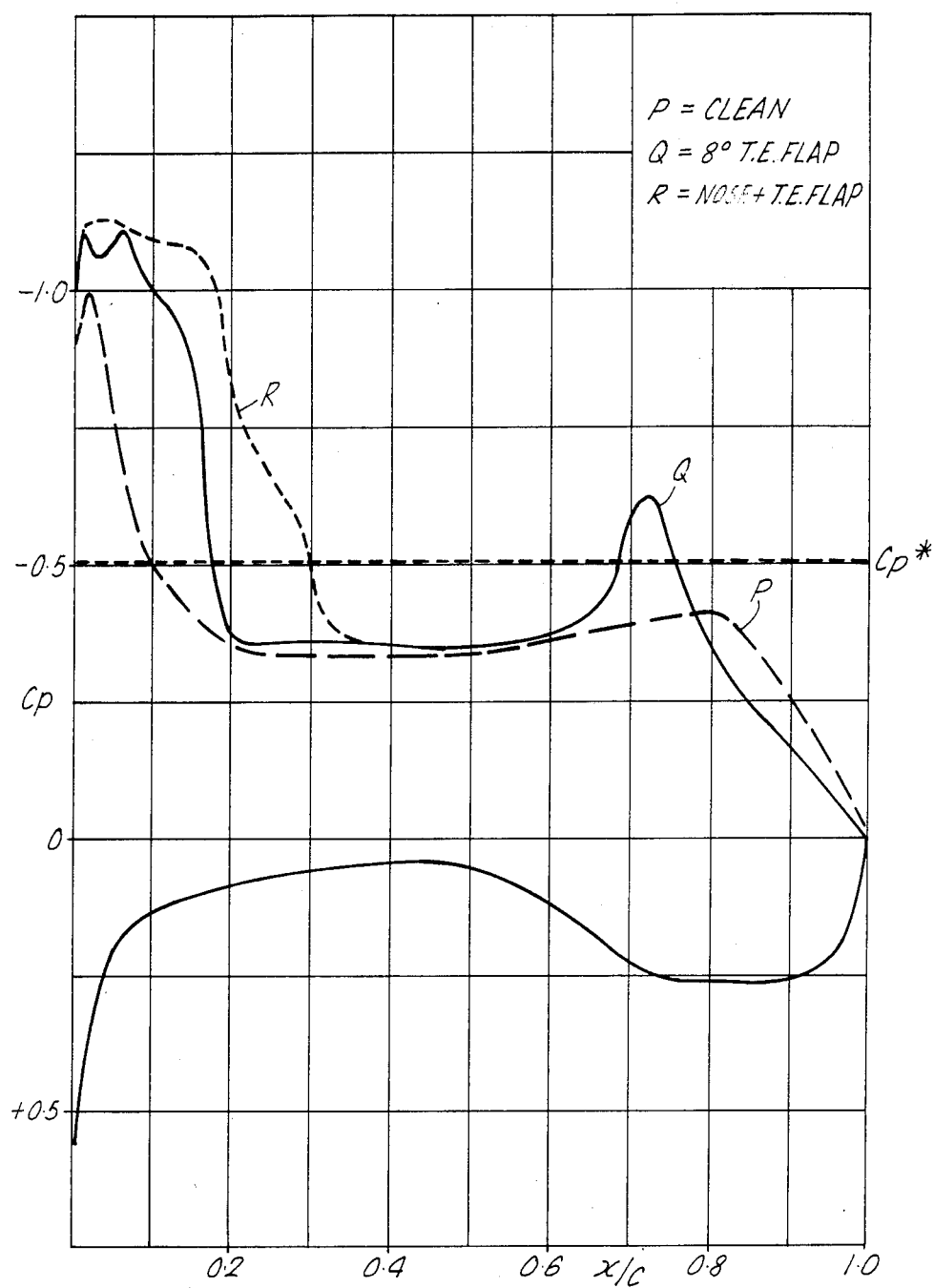
FIG. 5 is a graph of pressure distribution at design manoeuvre conditions.

In FIG. 5 the effect is illustrated of nose and trailing edge flaps on section A. Curve P shows the pressure distribution over the unmodified section at M=0.65 where the incidence is 1.6°. From an initial peak X=0.02C lift immediately reduces to a minimum which extends from about 0.2 to 0.6 x/c. It then rises to a slight peak at 0.6 x/c. With 8° of trailing edge flap deflection (curve Q) a much more solid region of high lift occurs at the leading edge, higher in quantity than that of the unmodified section and extending to beyond 0.1 x/c. A peak is also generated at 0.72 x/c. With a nose flap deflection of 6° at the first hinge point and 3.25° at the second (curve R) even greater lift is generated in a forward region of the section, extending to 0.2 x/c with a viscous bulge extending to 0.3 x/c the lift is brought to zero at the trailing edge and no separation occurs.

Figure 6:
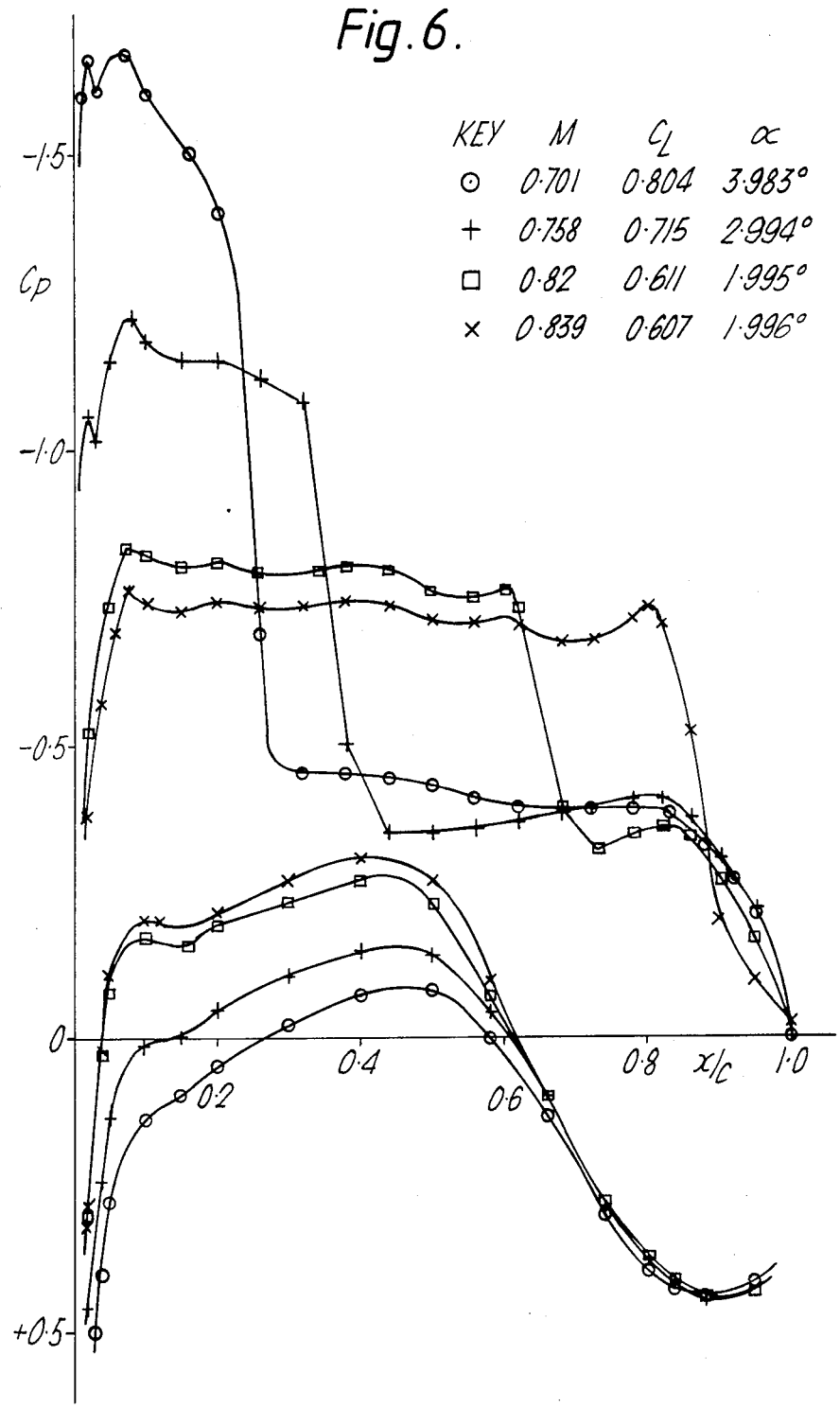
FIG. 6 is a graph of pressure distributions over a clean section at various Mach Numbers.
Figure 7:
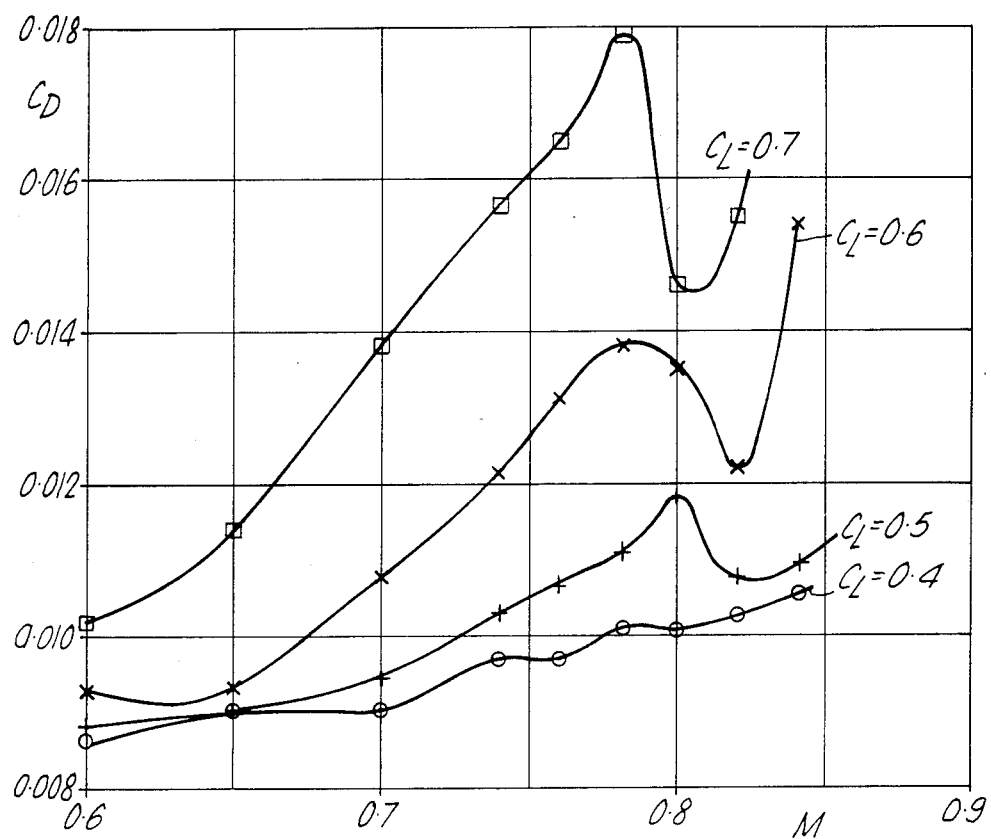
FIG. 7 is a graph of the effect of Mach Number on drag at various values of $C_L$.

FIG. 6 illustrates the pressure distribution over the model and appropriate angles of incidence for Mach Numbers of 0.7, 0.76, 0.82 and 0.84. They demonstrate a useful absence both of secondary shocks and of significant separation. FIG. 7 illustrates the variation of drag with Mach Number at various lift coefficients.

We claim:

1. A supercritical wing having a section comprising a thickness chord ratio between 8 and 9%, a leading edge region, an upper surface characterised by a first region extending from the leading edge region to about 10% chord and wherein curvature drops rapidly, a second region extending from about 10% chord to about midchord and wherein curvature drops less rapidly, a third, minimum curvature region, extending rearwardly from the second region to about 75% chord, and a fourth region extending rearwardly from the third region to the trailing edge and wherein the curvature is generally higher than in the third region, and the lower surface characterised by a first region extending rearwardly from the leading edge region and wherein curvature is generally higher than over the same extent of the upper surface, a second region extending rearwardly from the first and wherein curvature changes sense, and a third region extending rearwardly from the second region to the trailing edge and wherein the curvature is of the opposite sense to that in the lower surface first region and additionally comprising a downwardly deflectable trailing flap hinged to the wing section at a position between 70% and 80% chord, the flap and the upper surface comprising a means for generating re-expansion of the flow over the region of the flap hinge when the flap is deployed during supecritical conditions.

2. A wing as claimed in claim 1 and wherein the required upper surface curvature is a portion of the flap which is concealed until the flap is deployed.

3. A wing as claimed in claim 1 and wherein the required upper surface curvature is realised in a flexible surface flap.

4. A wing as claimed in claim 1 and wherein the flap comprises a flap supporting structure supporting flap upper and lower skins, and rotatably jointed to a main support structure adjacent one skin, a jack connecting said structure adjacent the other skin, a flexible skin extending rearward from the main upper skin over part of the flap supporting structure, and link means between the flexible skin and the flap supporting structure controlling the disposition of the flexible skin.

5. A wing as claimed in claim 4 and having a flexible skin member extending rearwardly from the lower main skin.

6. A wing as claimed in claim 1 and wherein the flap comprises a flexible upper skin and a lower skin, a series of support members extending chordwise in chain-like manner, attached to the lower skin, and rotatably jointed one to another adjacent the lower surface, above each joint a rod moveable in a spanwise direction and means adjacent the upper skin connecting each rod to adjacent support members, for example in a cam and follower relationship, such that movement of the rod causes relative rotation of the support members and a consequent change in flap camber, and means for maintaining the separation between the upper and lower skins in a predetermined relationship.

7. The wing as claimed in claim 1 and wherein the flap and upper and lower surfaces are separable toward the trailing edge, to generate a thick base.

8. The wing as claimed in claim 1 and having a nose flap.

9. The wing as claimed in claim 8 wherein the wing section has main upper and lower skins and a main support structure, and the nose flap comprises a forward flap support structure, an intermediate flap support structure, a flexible upper and lower flap skin, a link member, means controlling the disposition of the flexible upper skin, and a flap jack, the support structures supporting the lower skin, the intermediate support structure being rotatably jointed to the main support structure adjacent the lower surfaces, and the jack being connected between the intermediate and main support structures above the rotatable joint, the link member extending pivotally between the main structure and the forward support structure being rotatably jointed to the intermediate structure above the point at which the link is jointed to the forward support structure.

10. A wing as claimed in claim 1 and incorporating means for mnimising the boundary layer thickness ahead of the shock in supercritical conditions.

11. A wing as claimed in claim 10 and wherein the means for minimising the boundary layer thickness ahead of the shock in supercritical conditions include boundary layer suction.

12. A wing as claimed in claim 10 and wherein the means for minimising the boundary layer thickness ahead of the shock in supecritical conditions include vortex generators.

13. A wing as claimed in claim 1 and wherein the wing section has a cambered region extending over the last 25% of the chord.

14. A wing as claimed in claim 1 and having a leading edge radius of the order of 1% chord.

15. A wing as claimed in claim 1 and wherein curvature at 10% chord is between 0.6 and 1.0 on a unit chord basis.

16. A wing as claim in claim 1 and wherein the upper surface second region is arranged to maintain supercritical flow at the design condition, to bring about recompression in supercritical conditions below the design condition in such a manner as to maximise lift and minimise drag, and in subcritical conditions to maximise lift and minimise drag with or without a deflected nose flap.

17. A wing as claimed in claim 1 and wherein the upper surface third, minimum curvature, region is characterised by a substantially constant curvature.

18. A wing as claimed in claim 1 and wherein the upper surface third, minimum curvature region has its most significant point of minimum curvature as far rearwardly as a requirement to avoid flow separation ahead of the trailing edge will permit.

19. A wing as claimed in claim 18 and wherein the upper surface third, minimum curvature, region has its most significant point of minimum curvature at 70–75% chord.

20. A wing as claimed in claim 1 and wherein the upper surface third, minimum curvature, region has a curvature between 0.09 and 0.15.

21. A wing as claimed in claim 1 and wherein the upper surface third, minimum curvature, region has one or two secondary points of minimum curvature.

22. A wing as claimed in claim 21 and wherein the upper surface third, minimum curvature, region has secondary points of minimum curvature at 50% and 58% chord.

23. A wing as claimed in claim 1 and wherein principal minimum curvature is about 0.03 and occurs at about 72% chord.

* * * * *